United States Patent
Haddad

(10) Patent No.: US 9,571,708 B2
(45) Date of Patent: Feb. 14, 2017

(54) DETACHABLE LENS SHUTTERING APPARATUS FOR USE WITH A PORTABLE COMMUNICATION DEVICE

(71) Applicant: Vysk Communications, Inc., San Antonio, TX (US)

(72) Inventor: Waleed Sami Haddad, San Francisco, CA (US)

(73) Assignee: VYSK COMMUNICATIONS, INC., San Antonio, TX (US)

( * ) Notice: Subject to any disclaimer, the term of this patent is extended or adjusted under 35 U.S.C. 154(b) by 0 days.

(21) Appl. No.: 14/566,378

(22) Filed: Dec. 10, 2014

(65) Prior Publication Data

US 2015/0163385 A1     Jun. 11, 2015

Related U.S. Application Data

(60) Provisional application No. 61/914,367, filed on Dec. 10, 2013.

(51) Int. Cl.
| | | |
|---|---|---|
| H04N 5/225 | (2006.01) | |
| H04M 1/02 | (2006.01) | |
| G03B 11/04 | (2006.01) | |
| G03B 9/36 | (2006.01) | |

(52) U.S. Cl.
CPC .......... *H04N 5/2254* (2013.01); *G03B 11/043* (2013.01); *H04M 1/0264* (2013.01); *G03B 9/36* (2013.01)

(58) Field of Classification Search
CPC .................................................. H04N 5/2254

USPC ......................................................... 348/374
See application file for complete search history.

(56) References Cited

U.S. PATENT DOCUMENTS

| | | | |
|---|---|---|---|
| 5,949,892 | A | 9/1999 | Stewart |
| 7,581,893 | B2 | 9/2009 | Miramontes |
| 7,728,906 | B2 | 6/2010 | Bilbrey |
| 8,004,603 | B2 | 8/2011 | Nozaki |
| 8,253,852 | B2 | 8/2012 | Bilbrey |
| 8,432,485 | B1 | 4/2013 | Martinez et al. |
| 8,471,956 | B2 | 6/2013 | Fortmann |
| 8,496,390 | B2 | 7/2013 | Ohuchi et al. |
| 8,724,020 | B1 | 5/2014 | Haddad |
| 8,731,186 | B1 | 5/2014 | Haddad |
| 2005/0052567 | A1 | 3/2005 | Huang et al. |
| 2005/0068423 | A1 | 3/2005 | Bear et al. |
| 2005/0225668 | A1 | 10/2005 | Kim |

(Continued)

FOREIGN PATENT DOCUMENTS

| | | |
|---|---|---|
| JP | 2007065443 | 3/2007 |
| KR | 1020060031900 | 4/2006 |

(Continued)

OTHER PUBLICATIONS

U.S. File History for U.S. Appl. No. 14/102,382.

(Continued)

*Primary Examiner* — Usman Khan
(74) *Attorney, Agent, or Firm* — Workman Nydegger

(57) ABSTRACT

An apparatus for use with an electronic device having a camera. The apparatus comprises a structure configured to detachably couple to the device, and a shutter supported by the structure and comprising a lens shutter configured to obscure a lens of the camera when in an engaged position.

12 Claims, 6 Drawing Sheets

(56) References Cited

U.S. PATENT DOCUMENTS

| | | | |
|---|---|---|---|
| 2007/0242948 A1* | 10/2007 | Miramontes | G03B 17/00 396/448 |
| 2008/0187306 A1* | 8/2008 | Sugiura | G03B 5/02 396/349 |
| 2011/0058255 A1 | 3/2011 | Weiss | |
| 2011/0063864 A1 | 3/2011 | Brown et al. | |
| 2011/0065392 A1* | 3/2011 | Chung | H04B 7/0805 455/67.11 |
| 2012/0183156 A1 | 7/2012 | Schlessinger et al. | |
| 2012/0229380 A1* | 9/2012 | Silvester | G06F 1/1626 345/158 |
| 2012/0301132 A1 | 11/2012 | Mitskog et al. | |
| 2013/0050549 A1 | 2/2013 | Bilbrey | |
| 2013/0162124 A1* | 6/2013 | Miyaoka | H05K 5/0217 312/223.1 |
| 2013/0222609 A1 | 8/2013 | Soffer | |
| 2015/0163383 A1 | 6/2015 | Barangan et al. | |
| 2015/0163589 A1 | 6/2015 | Haddad | |

FOREIGN PATENT DOCUMENTS

| | | |
|---|---|---|
| KR | 100598053 | 7/2006 |
| KR | 101149925 | 5/2012 |

OTHER PUBLICATIONS

U.S. File History for U.S. Appl. No. 14/102,387.
U.S. File History for U.S. Appl. No. 14/276,288.
U.S. File History for U.S. Appl. No. 14/840,602.
International Search Report and Written Opinion dated Mar. 12, 2015 for PCT Application No. PCT/US2014/069568, 11 pages.
International Search Report and Written Opinion dated Mar. 31, 2015 for PCT Application No. PCT/US2014/069571, 12 pages.

* cited by examiner

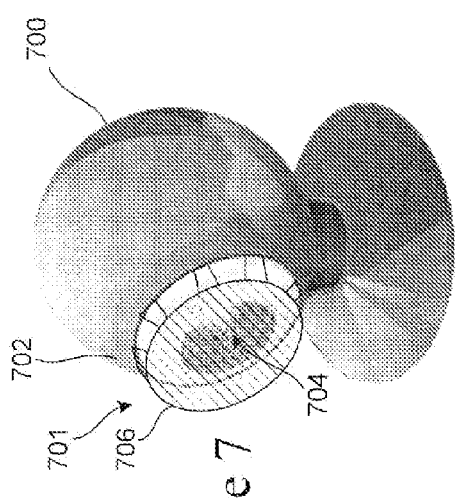
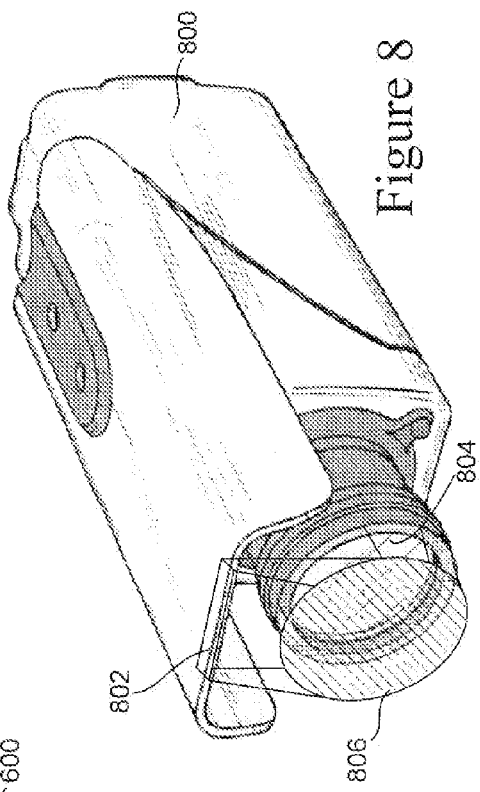
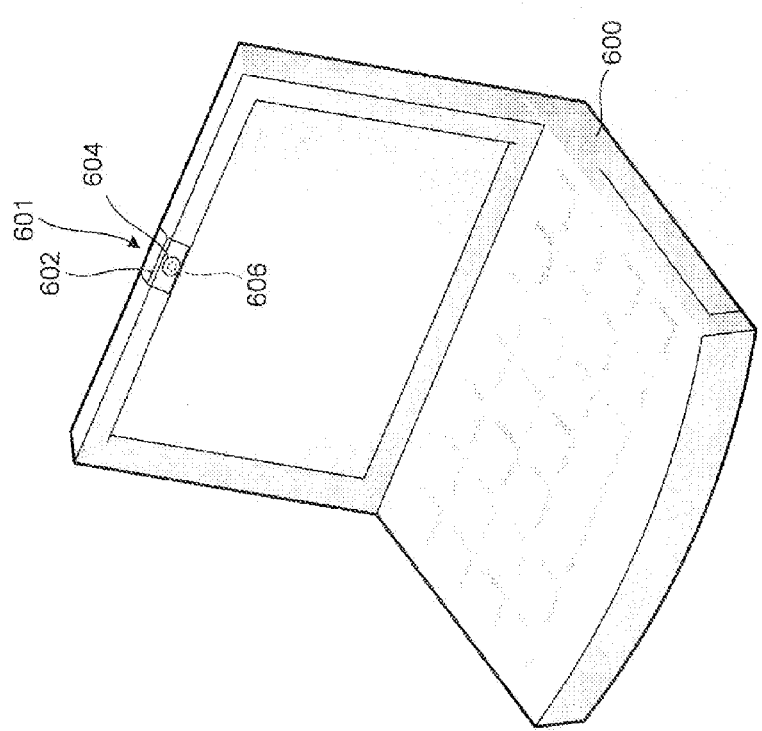

DETACHABLE LENS SHUTTERING APPARATUS FOR USE WITH A PORTABLE COMMUNICATION DEVICE

RELATED PATENT DOCUMENTS

This application claims the benefit of Provisional Patent Application Ser. No. 61/914,367 filed on Dec. 10, 2013, to which priority is claimed pursuant to 35 U.S.C. §119(e) and which is hereby incorporated herein by reference in its entirety.

SUMMARY

Embodiments are directed to an apparatus for use with an electronic device having a camera. The apparatus comprises a structure configured to detachably couple to the device; and a shutter supported by the structure and movable between an engaged position and a non-engaged position. The shutter comprises a lens shutter configured to obscure a lens of the camera when in the engaged position.

According to other embodiments, an apparatus for use with an electronic device having a camera includes a structure configured to detachably couple to the device. A shutter is supported by the structure and comprises a lens shutter configured to selectively obscure a lens of the camera in response to an activation signal.

In other embodiments, a method involves a networked electronic device having a camera. The method involves selectively activating and deactivating a lens shutter of a shutter arrangement positioned relative to a lens of a camera of the networked electronic device. The method also involves obscuring the lens of the camera using the lens shutter when activated. The lens of the camera remains unobstructed by the lens shutter when not activated.

Some embodiments are directed to an apparatus for use with a portable communication device having a camera, a microphone, and a display. The apparatus comprises a structure configured to detachably couple to the communication device, a user-actuatable switch supported by the structure, and a shutter supported by the structure and coupled to the switch. The shutter is operable in a first state and a second state in response to the switch. The shutter comprises a lens shutter configured to obscure a lens of the camera when the shutter is in the first state and to be substantially non-obscuring with respect to the camera lens when the shutter is in the second state. The shutter is configured to avoid obscuring the microphone when in either the first state or the second state.

Other embodiments are directed to an apparatus for use with a portable communication device having opposing front and rear surfaces, a peripheral edge surface between the front and rear surfaces, a first camera on the rear surface, a second camera and a display respectively on the front surface, and a microphone. The apparatus comprises a structure configured to detachably couple to the communication device and cover at least a portion of the front, rear, and peripheral edge surfaces of the communication device. A user-actuatable switch is supported by the structure. A shutter is supported by the structure and coupled to the switch. The shutter is operable in a first state and a second state in response to the switch, and configured to avoid obscuring the microphone when in either the first state or the second state. The shutter comprises a first lens shutter configured to obscure a lens of the first camera when the shutter is in the first state and to be substantially non-obscuring with respect to the first camera lens when the shutter is in the second state. The shutter also comprises a second lens shutter configured to obscure a lens of the second camera when the shutter is in the first state and to be substantially non-obscuring with respect to the second camera lens when the shutter is in the second state. The first and second lens shutters operate in tandem in the first and second states.

Embodiments are directed for use with a wide variety of electronic devices having a camera, particularly networked electronic devices having one or more cameras. Representative electronic devices with which a camera disruption apparatus and method of the present disclosure can be practiced include a laptop, a tablet, a webcam, a security device having a camera, and a security camera, for example.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein:

FIG. 6 illustrates a camera disruption apparatus configured to obscure the lens of a laptop camera in accordance with various embodiments;

FIG. 7 illustrates a camera disruption apparatus configured to obscure the lens of a webcam in accordance with various embodiments; and FIG. 8 illustrates a camera disruption apparatus configured to obscure the lens of a security camera in accordance with various embodiments.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part of the description hereof and in which are shown by way of illustration several specific embodiments. It is to be understood that other embodiments are contemplated and may be made without departing from the scope of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Embodiments of the disclosure are directed to an apparatus and method for rendering a camera of an electronic device temporarily unusable. Embodiments of the disclosure are directed to an apparatus and method for rendering a multiplicity of cameras of an electronic device temporarily unusable. According to various embodiments, a camera disruption apparatus is configured to render one or more cameras of a networked electronic device temporarily unresponsive during a time in which privacy is desired. The camera disruption apparatus is configured to render a camera of the device temporarily unusable by temporarily covering or obscuring a lens of the camera during a time in which privacy is desired. In some embodiments, a camera disruption apparatus is fixed in position relative to the camera(s) of an electronic device to which the apparatus is detachably affixed. In other embodiments, a camera disruption apparatus is moveable relative to the camera(s) of an electronic device to which the apparatus is detachably affixed. Embodiments of the disclosure are directed to apparatuses and methods that prevent surreptitious use of one or more cameras of an electronic device that includes a communication facility (e.g., a web-based or networked electronic device).

Figure 1:
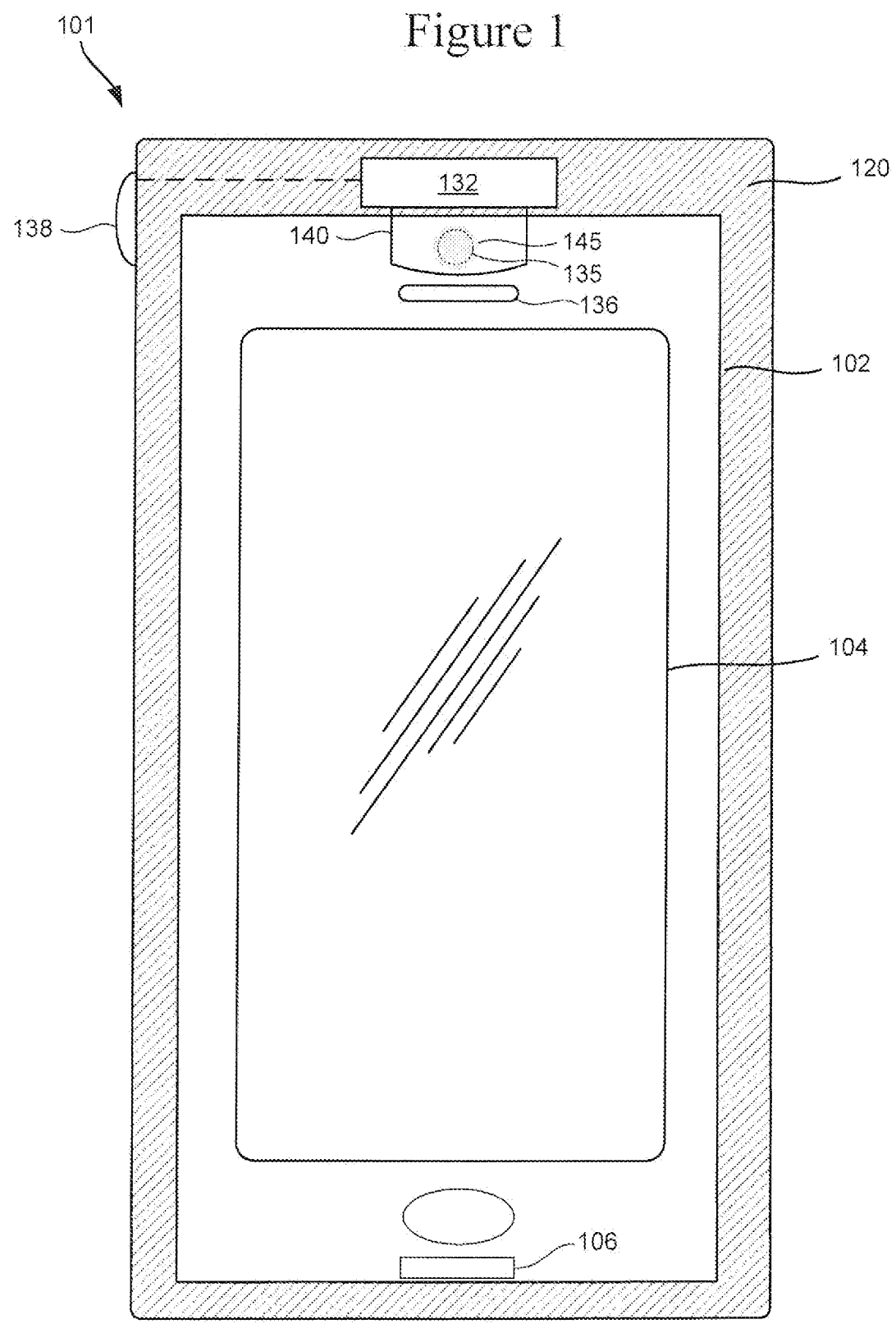
FIG. 1 is an illustration of a camera disruption apparatus for use with an electronic device having a camera in accordance with various embodiments.

FIG. 1 is an illustration of a camera disruption apparatus for use with an electronic device having a camera in accordance with various embodiments. The apparatus 101 illustrated in FIG. 1 is shown detachably coupled to a hand-held electronic device 102, which includes a display 104, two microphones 106 (lower) and 136 (upper), and a front camera 135. The apparatus 101 is detachably affixed to the electronic device 102 so that at least a portion of the apparatus 101 is proximate to the camera 135. According to various embodiments, the apparatus 101 can be configured as a support structure 120, such as a cover (full or partial), a case (full or partial), a sleeve, a band or a clip, that can be detachably affixed to the housing of the electronic device 102. For example, the support structure 120 can be implemented as a two-part case or cover with snap-fit features that allow the support structure 120 to be attached and detached from the electronic device 102. The support structure 120 is configured to support the various components of the camera disruption apparatus.

In the representative embodiment shown in FIG. 1, electronic device 102 includes a front camera 135 situated near the upper edge surface of the device 102. The device 102 also includes an upper microphone 136 near the front camera 135. When the support structure 120 is properly coupled to the device 102, a shutter 140 extends over a portion of the front surface of the electronic device 102 so that the shutter 140 covers the front camera 135, but avoids the microphone 136. The shutter 140 can be formed from a transparent plastic or painted plastic (e.g., in a color that matches the border region of the device 102).

According to some embodiments, the shutter 140 comprises an electro-optical element 145, such as a liquid crystal element, that shutters the lens of the camera 135 by changing from clear to opaque, or becomes diffusive, upon receiving an electrical stimulus. A switch 138 is provided on the support structure 120 and can be manually controlled by a user to activate and deactivate the lens shutter 145. The lens shutter and the switch 138 are coupled to a power source 132, such as a battery, also attached to the support structure 120. An electrical lead extends between the lens shutter 145 and the power source 132 and/or switch 138. The shutter 204 can, for example, include a channel within which the electrical lead can be recessed and installed. Use of an electro-optical element 145 as a lens shutter is particularly useful in embodiments where the shutter 140 is fixed. In other embodiments, as will be described hereinbelow, the shutter 140 is movable. In such movable embodiments, the lens shutter 145 may comprise an electro-optical element or may comprise a coating or insert of opaque or diffuse material.

Figure 2A:
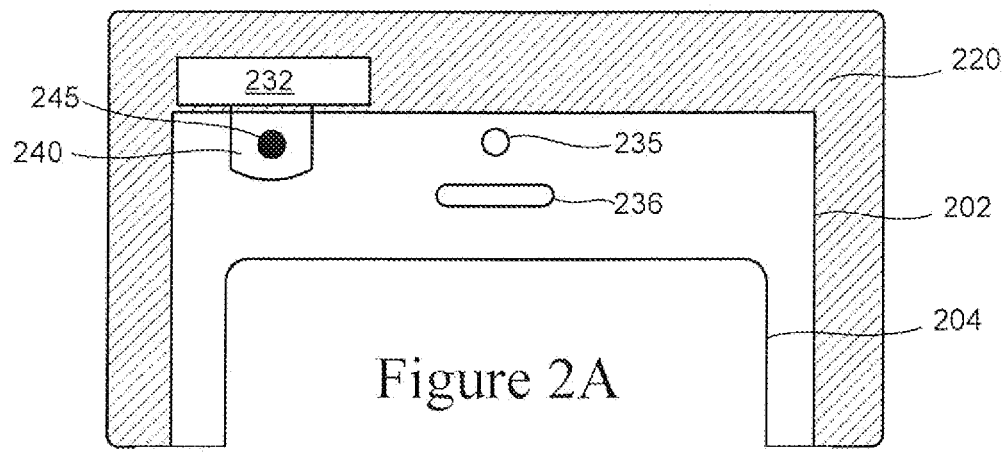
FIGS. 2A-2C illustrate a movable camera disruption apparatus for use with an electronic device having a camera at different positions between non-engagement and engagement states in accordance with various embodiments.
Figure 2B:
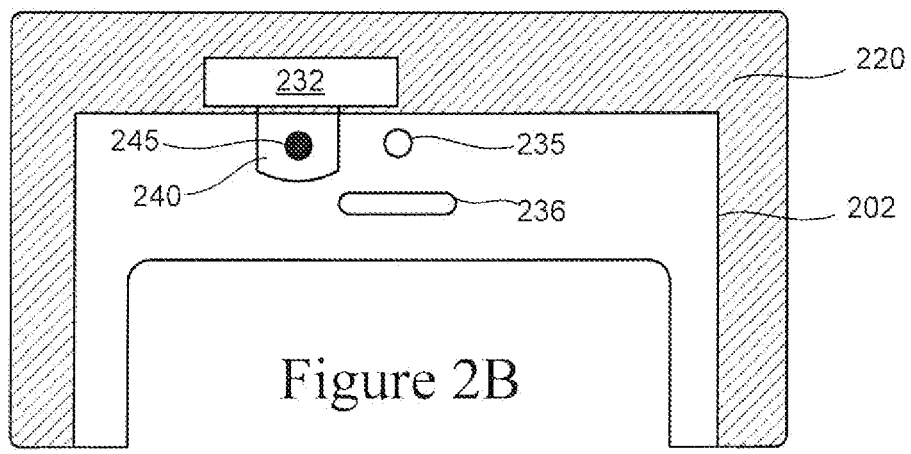
Figure 2C:
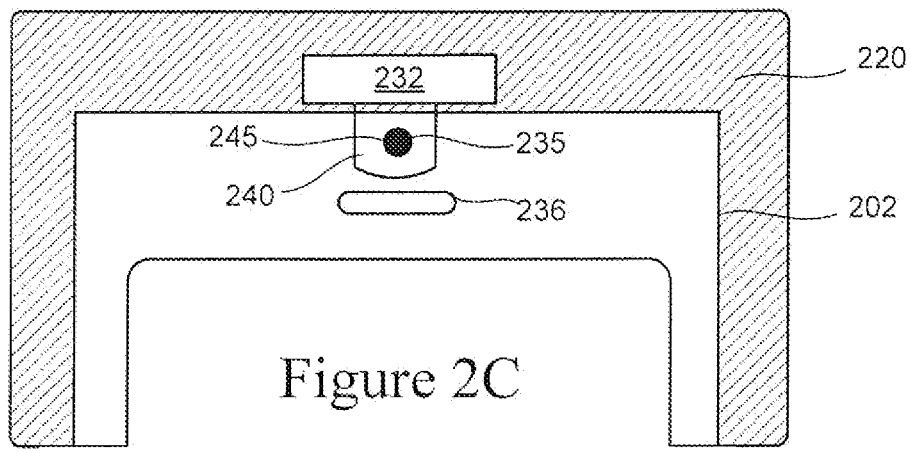

FIGS. 2A-2C are illustrations of a camera disruption apparatus for use with an electronic device having a camera in accordance with various embodiments. The device 202 is shown to include a display 204 and a microphone 236. In FIGS. 2A-2C, the camera disruption apparatus includes a support structure 220 that supports a movable shutter 240 shown at various stages of advancement between a non-engaged position and engaged position. In some embodiments, the shutter 240 includes a passive lens shutter 245, such as an opaque coating or an optically obscuring material. In various embodiments employing a passive lens shutter 245, the shutter 240 comprises a planar member extending from a slidable support member 232. In other embodiments, the shutter 240 includes an active lens shutter 245, such as an electro-optical element. In various embodiments employing an active lens shutter 245, a power source 232 is configured to travel with the movable shutter 240. Alternatively, the power source 232 can be fixed and a flexible connector can electrically couple the lens shutter 245 and the power source 232.

FIG. 2A shows the shutter 240 in a non-engaged position, such that the shutter 240 is spaced away from the camera 235 of the electronic device 202. FIG. 2B shows the shutter 240 in between a non-engaged position and an engaged position. FIG. 2C shows the shutter 240 in an engaged position, such that the shutter 240 is positioned over the camera 235, and preferably avoids covering the microphone 236. In the engaged position, the lens shutter 245 serves to obscure (e.g., cover or obstruct) the lens of the camera 235. In some embodiments, the shutter 240 is configured for translation between the non-engaged and engaged positions by way of manual effort (e.g., a user's thumb). In other embodiments, such as those discussed hereinbelow, an electro-mechanical mechanism (e.g., an electric motor powered by a battery) can be included within the support structure 220 to provide automated translation of the shutter 240 between non-engaged and engaged positions. For example, a motor and a battery can be supported by the support structure 220, and the motor can be configured to move the shutter 240 into and out of an obscuring relationship with respect to the lens of the camera 235 in response to actuation of a switch provided on the support structure 220.

Figure 3A:
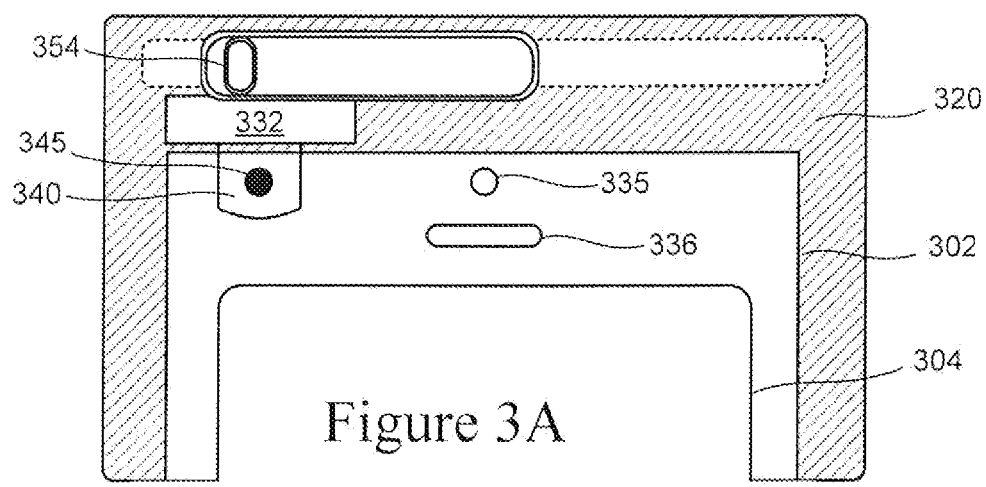
FIGS. 3A-3C illustrate a movable camera disruption apparatus for use with an electronic device having a camera at different positions between non-engagement and engagement states in accordance with other embodiments.
Figure 3B:
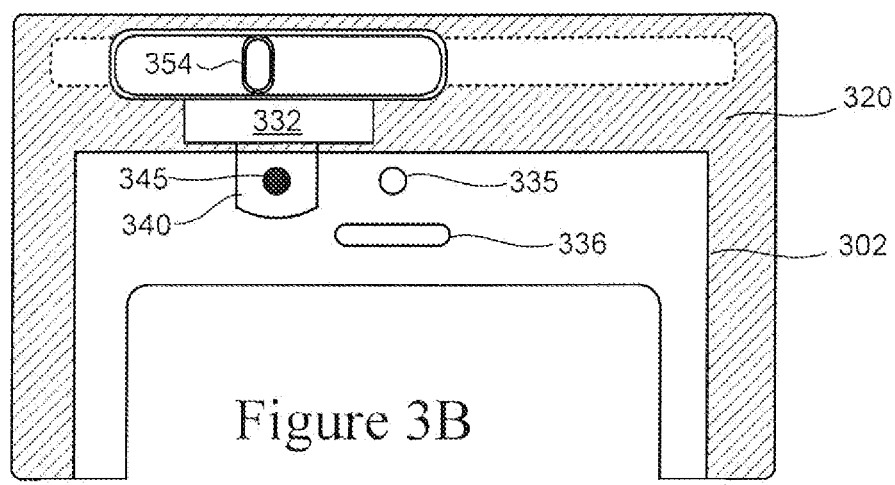
Figure 3C:
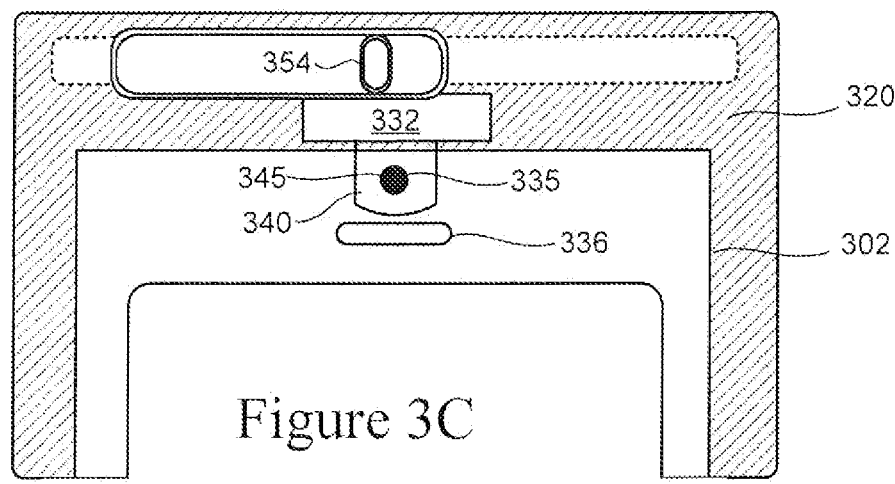

FIGS. 3A-3C are illustrations of a camera disruption apparatus for use with an electronic device having a camera in accordance with various embodiments. The device 302 is shown to include a display 304 and a microphone 336. In FIGS. 3A-3C, the camera disruption apparatus includes a support structure 320 that supports a movable shutter 340 shown at various stages of advancement between a non-engaged position and engaged position. In various embodiments, the shutter 340 and optionally the power source 332 are configured to travel in tandem. The shutter 340 and optionally the power source 332 are connected to a slider 354 which can be manually slid between a non-engaged position and an engaged position. In some embodiments, the shutter 340 includes a channel within which an electrical lead arrangement runs between the power source 332 and an electro-optical element serving as a lens shutter 345. Alternatively, the lens shutter 345 is a passive element, such as an opaque coating or material.

FIG. 3A shows the shutter 340 in a non-engaged position, such that the shutter 340 is spaced away from the camera 335 of the electronic device 302. A manual force applied to the slider 354 in the direction of the camera 335 causes the shutter 340 and optionally the power source 332 to move toward the camera 335, as shown in FIG. 3B. FIG. 3B shows the shutter 340 in a position between a non-engaged position and an engaged position. FIG. 3C shows the shutter 340 in an engaged position, such that the shutter 340 is positioned over the camera 335, and preferably avoids covering the microphone 336. In the engaged position, the lens shutter 345 serves to obscure the lens of the camera 335.

Figure 4A:
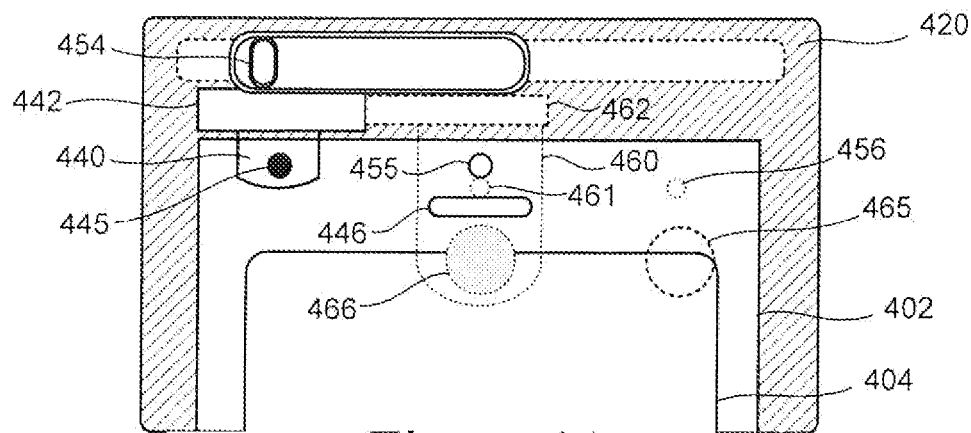
FIGS. 4A-4C illustrate a movable camera disruption apparatus for use with an electronic device having a multiplicity of cameras at different positions between non-engagement and engagement states in accordance with various embodiments.
Figure 4B:
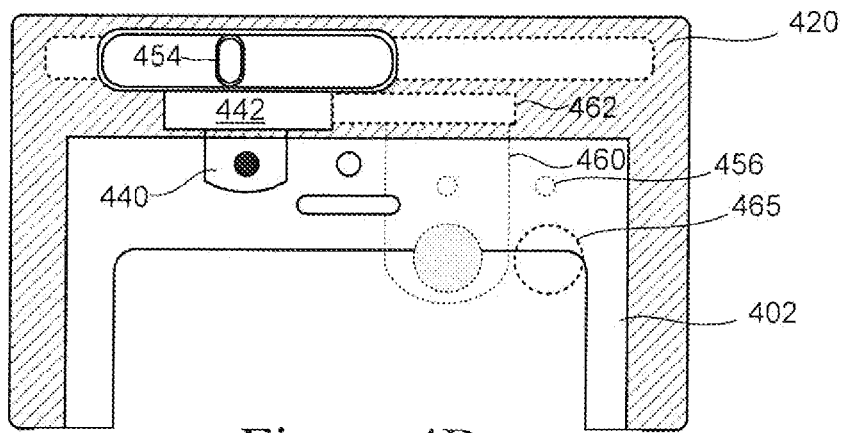
Figure 4C:
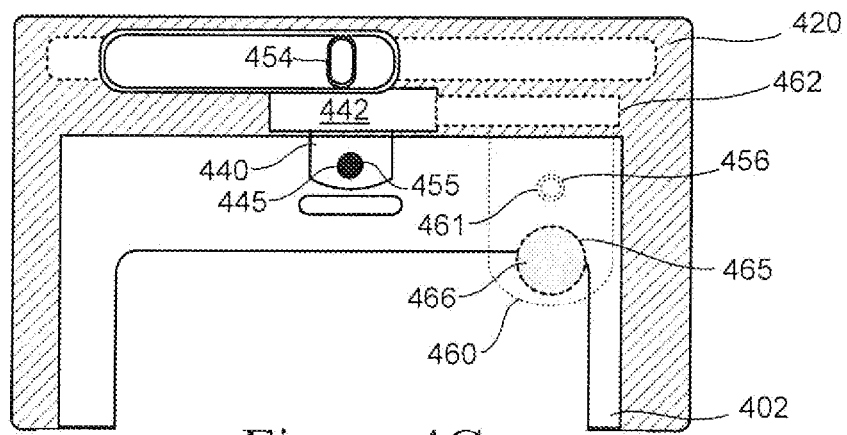

FIGS. 4A-4C are illustrations of a camera disruption apparatus for use with an electronic device having a multiplicity of cameras in accordance with various embodiments. The device 402 shown in FIGS. 4A-4C includes a display 404, a front camera 455, a front microphone 446, a rear camera 465, and a rear microphone 456. The camera disruption apparatus shown in FIGS. 4A-4C includes a support structure 420 that supports two movable shutters 440 and 460 (shown in phantom). Shutter 440 serves to provide camera disruption for a first major surface (e.g., front) of the electronic device 402 and shutter 460 serves to provide camera disruption for a second major surface (rear) of the device 402. The front shutter 440 moves and functions as previously described, moving in tandem with the slider 454. The rear shutter 460 is connected to the slider 454 and moves in concert with the front shutter 440 as the slider 454 is translated axially by the user of the electronic device 402.

In some embodiments, each of the shutters 440 and 460 include a passive lens shutter 445 and 466. In other embodiments, each of the shutters 440 and 460 include an active lens shutter 445 and 466. In some embodiments, a single power source 442 is coupled to the lens shutters 445 and 446 of the front and rear shutters 440 and 460, and travels with the two shutters 440 and 460 in response to movement of the slider 454. In other embodiments, a first power source 442 is coupled to the front shutter 440 and a second power source 462 is coupled to the rear shutter 460, and both power sources 442 and 462 travel with the two shutters 440 and 460 in response to movement of the slider 454. In further embodiments, one of the shutters 440 and 460 can include a passive lens shutter 445 and 446, while the other of the two shutters 440 and 460 can include an active lens shutter 445 and 446.

FIG. 4A shows the shutters 440 and 460 in a non-engaged position, such that the shutters 440 and 460 are spaced away from cameras 455 and 456 on the front and rear surface of the electronic device 402. A manual force applied to the slider 454 in the direction of the front camera 455, for example, causes the front and rear shutters 440 and 460 and power source 442 (and 462 if present) to move toward their respective destination cameras, as shown in FIG. 4B. FIG. 4B shows the shutters 440 and 460 in a partially engaged position, such that the shutters 440 and 460 partially cover their respective destination cameras and microphones. FIG. 4C shows the shutters 440 and 460 in an engaged position, such that the front shutter 440 is positioned over the front camera 455, and the rear shutter 460 is positioned over the rear camera 456. In the engaged position, the lens shutters 445 and 466 serve to obscure the lenses of the front and rear cameras 445 and 456. In some embodiments, the slider 454 serves as a switch, causing power to be supplied to the lens shutters 445 and 466 when the shutters 440 and 460 are in their respective engaged positions. Power to the lens shutters 445 and 466 is removed when the slider 454 is moved out of the engaged position.

In some embodiments, the support structure 420 is configured to support a motor, a battery, and a switch. Rather than having a manually actuated slider 454, a switch fixed on the support structure 420 can be actuated by a user which causes the motor to draw power from the battery and move the shutters 440 and 460 to their respective engaged (obscuring) positions. Properly actuating the switch (e.g., moving the switch to a second position or pressing on the switch a second time) by the user causes the motor to draw power from the battery and move the shutters 440 and 460 to their respective disengaged (non-obscuring) positions.

Figure 5:
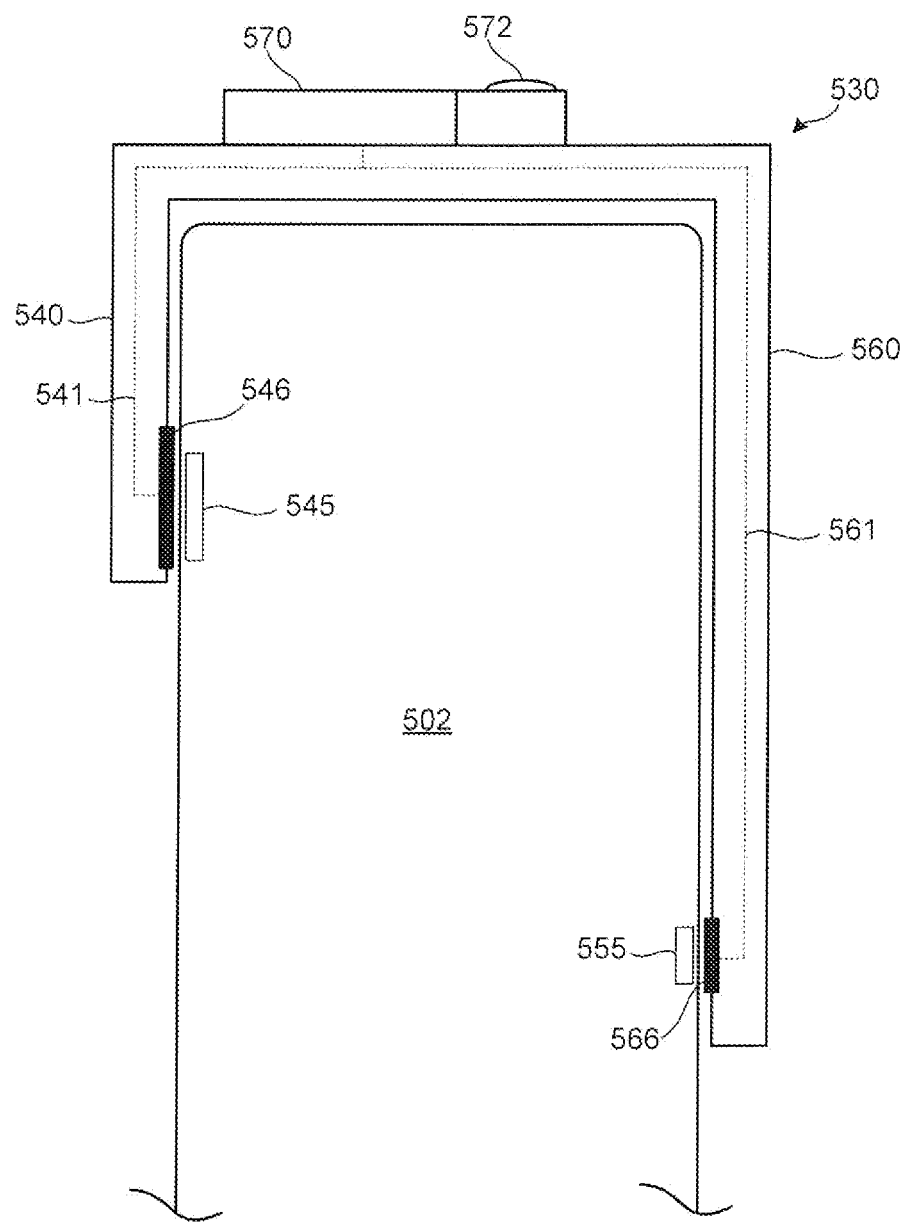
FIG. 5 illustrates a shutter arrangement of a camera disruption apparatus configured to obscure the lenses of two cameras of an electronic device in accordance with various embodiments.

FIG. 5 is a side view of a shutter arrangement of a camera disruption apparatus in accordance with various embodiments. The shutter arrangement 530 shown in FIG. 5 has a generally U-shaped configuration, and includes a first shutter 540 and a second shutter 560. The first and second shutters 540 and 560 are spaced apart by a distance slightly greater than a thickness of an electronic device 502 (e.g., a smartphone). The shutter arrangement 530, according to various embodiments, can be incorporated in a cover, a sleeve, a band, a clip or other coupling structure that can be detachably affixed to the device 502. The first shutter 540 includes a first lens shutter 546 positioned to align with a first camera 545 of the device 502. The second shutter 560 includes a second lens shutter 566 positioned to align with a second camera 555 of the device 502.

In the illustrative embodiment of FIG. 5, the cameras 545 and 555 are located on opposing major surfaces (e.g., front and rear surfaces) of the device 502. In some embodiments, the first and second shutter lenses 546 and 566 are passive (e.g., comprise an opaque coating or material). In other embodiments, the first and second shutter lenses 546 and 566 are active (e.g., include an electro-optical element). If active, each of the first and second shutters 540 and 560 includes an electrical lead 541 and 561 configured to couple the first and second lens shutters 546 and 566 to a power source 570 (or to separate power sources as discussed previously). As previously discussed, one of the first and second shutter lenses 546 and 566 can be active, while the other of the first and second shutter lenses 546 and 566 can be passive.

FIG. 6 shows a camera disruption apparatus 601 affixed to a laptop 600 having a built-in camera 604 in accordance with various embodiments. The camera disruption apparatus 601 shown in FIG. 6 includes a support structure 602 that facilitates attachment of the camera disruption apparatus 601 to a portion of the laptop 600 near the built-in camera 604. In one embodiment, the support structure 602 includes a compression member or arrangement (e.g., a clip) that produces a compressive force sufficient to secure the camera disruption apparatus 601 to the laptop 600 (e.g., such as to an edge of the laptop's display near the camera 604 as shown in FIG. 6). In some embodiments, the camera disruption apparatus 601 includes a passive lens shutter 606, in which case the lens shutter 606 can be manually or mechanistically moved into and out of alignment with the camera 604. For example, the camera disruption apparatus 601 can incorporate a slider mechanism of a type previously described. In other embodiments, the camera disruption apparatus 601 includes an active lens shutter 606, which can be activated by user actuation of a switch of the camera disruption apparatus 601. In some embodiments, the active lens shutter 606 can be triggered on and off remotely in response to a control signal generated by the laptop 600 or another device (e.g., the user's smartphone). In such embodiments, the disruption apparatus 601 includes a wireless receiver or transceiver. A power source, such as a battery, can be mounted on the support structure 602 and connected to the lens shutter 606 via an electrical lead. Alternatively, power can be derived from the laptop 600 or other powered component or power source near the laptop 600.

FIG. 7 shows a camera disruption apparatus 701 affixed to a webcam 700 having a camera 704 in accordance with various embodiments. The camera disruption apparatus 701 shown in FIG. 7 includes a support structure 702 that facilitates attachment of the camera disruption apparatus 701 to a portion of the webcam 700 near the camera 704. In one embodiment, the support structure 702 includes an array of compression members that produce a compressive force sufficient to secure the camera disruption apparatus 701 to the webcam 700 (e.g., such as to a frame of the webcam's camera 704 as shown in FIG. 7). In other embodiments, a hook and loop fixation arrangement with adhesive pads can be used to secure the camera disruption apparatus 701 to the webcam 700. It is understood that other affixation arrangements are contemplated depending on the configuration and materials of the webcam 700 to which the camera disruption apparatus 701 is detachably affixed.

In various embodiments, the camera disruption apparatus 701 includes an active lens shutter 706, which can be activated by user actuation of a switch of the camera disruption apparatus 701. The switch can be a manual switch or a switch responsive to a control signal generated remote from the webcam 700 (e.g., a control signal transmitted from a computer or smartphone via a wired or wireless connection). A power source, such as a battery, can be mounted on the support structure 702 and connected to the lens shutter 706 via an electrical lead. Alternatively, power can be derived from the webcam 700 or other powered component or power source near the webcam 700. In some embodiments, the camera disruption apparatus 701 includes a passive lens shutter 706, in which case the lens shutter 706 can be manually or mechanistically moved into and out of alignment with the camera 704.

FIG. 8 shows a camera disruption apparatus 801 affixed to a security camera 800 in accordance with various embodiments. The camera disruption apparatus 801 shown in FIG. 8 includes a support structure 802 that facilitates detachable attachment of the camera disruption apparatus 801 to a portion of the security camera 800 near the camera 804. In one embodiment, the support structure 802 includes a wire frame structure with compression members that produce a compressive force sufficient to secure the camera disruption apparatus 801 to the security camera 800 (e.g., such as to the lens of the camera 804 as shown in FIG. 7). A hook and loop fixation arrangement with adhesive pads can also be used to secure the camera disruption apparatus 801 to the security camera 800. It is understood that other affixation arrangements are contemplated depending on the configuration and materials of the security camera 800 to which the camera disruption apparatus 801 is detachably affixed.

In various embodiments, the camera disruption apparatus 801 includes an active lens shutter 806, which can be activated by user actuation of a switch of the camera disruption apparatus 801. The switch can be a manual switch or a switch responsive to a control signal generated remote from the security camera 800 (e.g., a control signal transmitted from a computer or smartphone via a wired or wireless connection). A power source, such as a battery, can be mounted on the support structure 802 and connected to the lens shutter 806 via an electrical lead. Alternatively, power can be derived from the security camera 800 or other powered component or power source near the security camera 800. In some embodiments, the camera disruption apparatus 801 includes a passive lens shutter 806, in which case the lens shutter 806 can be manually or mechanistically moved into and out of alignment with the camera 804.

In some embodiments, a camera disruption apparatus consistent with the present disclosure can be incorporated in a vehicle (e.g., an automobile) that is equipped with a camera, such as a camera used in a hands-free communication package installed in the vehicle. A manual or electric (e.g., electro-mechanical) switch provided on the dashboard or control console can be actuated by the driver as desired. Actuation of the switch causes a passive or active lens shutter (depending on the particular apparatus configuration) to obscure the vehicle's camera, thereby providing privacy against unwanted or unauthorized visual surveillance of the driver/vehicle.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An apparatus for use with a portable communication device having opposing front and rear surfaces, a peripheral edge surface between the front and rear surfaces, a first camera on the rear surface, a second camera and a display respectively on the front surface, and a microphone, the apparatus comprising:
   a structure configured to detachably couple to the communication device and cover at least a portion of the front, rear, and opposing peripheral edge surfaces of the communication device;
   a user-actuatable switch supported by the structure; and
   a shutter supported by the structure and coupled to the switch, the shutter operable in a first state and a second state in response to the switch, and configured to avoid obscuring the microphone when in at least one of the first state and the second state, the shutter comprising:
      a first lens shutter configured to obscure a lens of the first camera when the shutter is in the first state and to be substantially non-obscuring with respect to the first camera lens when the shutter is in the second state; and
      a second lens shutter configured to obscure a lens of the second camera when the shutter is in the first state and to be substantially non-obscuring with respect to the second camera lens when the shutter is in the second state;

wherein the first and second lens shutters operate in tandem in the first and second states.

2. The apparatus of claim 1, wherein:
the switch is a mechanical switch; and
the first lens shutter and the second lens shutter each comprises an opaque coating or material.

3. The apparatus of claim 1, wherein:
the switch is an electrical switch;
the first lens shutter and the second lens shutter each comprises an opto-electric element; and
the structure is configured to support a battery coupled to the switch and each of the opto-electric elements.

4. The apparatus of claim 1, wherein:
the shutter has a generally U-shaped configuration comprising a first elongated section supporting the first lens shutter and a second elongated section supporting the second lens shutter; and
the first elongated section is spaced apart from the second elongated section by a distance slightly greater than a thickness of portable communication device.

5. The apparatus of claim 1, wherein the first and second lens shutters are configured to move into and out of an obscuring relationship with respect to the first and second camera lenses in response to movement of the switch.

6. The apparatus of claim 1, comprising a power source supported by the structure.

7. The apparatus of claim 6, wherein:
the switch is configured to move between a first position and a second position; and
the power source and the shutter are configured to move with the switch.

8. The apparatus of claim 1, wherein the shutter and the switch remain positionally fixed when the shutter is in the first state and the second state.

9. The apparatus of claim 1, wherein:
the switch comprises a slider configured to be manually slid between a non-engaged position and an engaged position;
the shutter is mechanically coupled to the switch and slides in tandem with the switch;
the first and second lens shutters are configured to respectively obscure the lens of the first and second cameras when the switch is slid to the engaged position; and
the first and second lens shutter are configured to respectively avoid the lens of the first and second cameras when the switch is slid to the non-engaged position.

10. The apparatus of claim 1, wherein:
a motor and a battery are supported by the structure; and
the motor is configured to move the first and second lens shutters into and out of an obscuring relationship with respect to the first and second camera lenses in response to actuation of the switch.

11. The apparatus of claim 1, wherein the structure defines a case or cover configured for attachment to and detachment from the communication device.

12. The apparatus of claim 1, wherein the structure comprises:
a two-part case or cover; and
one or more features that facilitate attachment and detachment of the case or cover respectively to and from the communication device.

* * * * *